Nov. 12, 1957 R. T. WALL 2,812,549

METHOD OF MAKING FLAT PRINTING PLATES OF THERMO-ACTIVE MATERIAL

Filed Aug. 16, 1954

INVENTOR.
RICHARD T. WALL.
BY *Louis V. Lucia.*
ATTORNEY.

United States Patent Office 2,812,549
Patented Nov. 12, 1957

2,812,549

METHOD OF MAKING FLAT PRINTING PLATES OF THERMO-ACTIVE MATERIAL

Richard T. Wall, Hartford, Conn., assignor to C S W Plastic Types, Inc., Rocky Hill, Conn., a corporation of Connecticut Application August 16, 1954, Serial No. 449,825

4 Claims. (Cl. 18—47.5)

This invention relates to a method of making flat printing plates of thermo-active material and more particularly to a method of producing flat plastic patterns from molds of metal or infusible plastic material.

It is well known amongst those skilled in the art that printing plates, and particularly those which are to be used as patterns from which printing mats and the like are made, have been commonly produced from a suitable mold of infusible material by placing upon the mold a thermo-active moldable material, which may be either thermo-plastic, or thermo-setting and in powder or sheet form, then heating said material to soften it while at the same time applying pressure to force it into the mold for an impression of the type or other formations present in the mold, and then curing the molded pattern by retaining it under heat for a predetermined period of time.

Heretofore it has been customary to simply allow the molded pattern plate to cool in any convenient manner and, upon removing said pattern plates from the mold, it has been common to have them warp or curl to the extent that the resultant curvature presented considerable difficulty in handling and storing the patterns and in the production of mats from such patterns due to the fact that the patterns would not stack properly and that, when placed in a press with a blank sheet applied thereto for producing a mat, the edges of the pattern would rub upon the surface of the said sheets, as they are flattened out under the plate of the press, and cause damage to the surface of the mat sheet as well as other inconveniences.

It is an object of the present invention, therefore, to provide a novel method of cooling the molded pattern plate in such a manner that all internal stresses and tensions which would cause warping or curling of the said plate will be relieved.

A still further object of this invention is to provide a novel method of molding, curing, and cooling a plate of thermo-plastic, or thermo-setting, material in such a manner as to prevent the molded plate from curling or warping.

Further objects and advantages of this invention will be more clearly understood from the following description and from the accompanying drawings in which.

Figure 1:
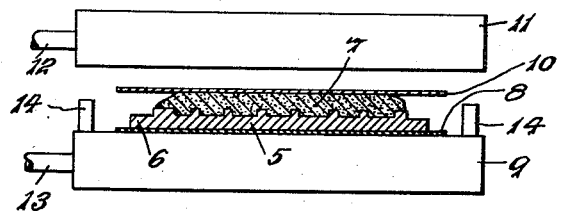
Fig. 1 is a front view illustrating a heating press containing a mold and moldable material to be molded according to my novel method.
Figure 2:
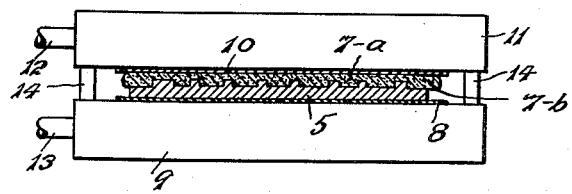
Fig. 2 is a similar view showing the said moldable material under pressure in said heating press.
Figure 3:
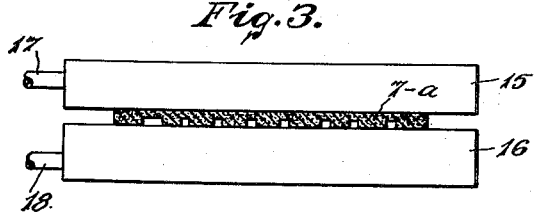
Fig. 3 is a front view of a cooling press showing the molded material therein.

In carrying out my invention, the mold 5, which may be of a metal, vulcanized rubber or a suitable plastic material that is infusible under the temperatures of the heat used in the molding operation, is first coated with a suitable releasing agent, preferably in the nature of a graphite solution, by first applying the said solution to the surface of the mold from which the pattern is to be made and brushing it into the said surface until it has dried; then applying a second coat of said solution to the same surface, again brushing it in until it has dried, then applying a third coat of said solution to only the border of the mold and letting it dry.

The said mold is then placed in a drying oven for a predetermined period of time sufficient to allow it to become thoroughly dry. It is then removed from the oven and a required amount of moldable material 7 is placed upon it and the said mold, together with the material thereon, is placed upon a suitable platen 8 on the surface of the bottom plate 9 of the heating press. A sheet of metal 10, such as aluminum, which has been previously coated with graphite and allowed to dry, is then placed upon the moldable material 7. The upper plate 11 of the heating press is then allowed to gradually move downwardly upon the entire assemblage at a controlled rate of movement that will allow the moldable material to become plastic under the heat of the plates 9 and 11, which are heated by suitable means, such as by steam circulated through the pipes 12 and 13, while applying an initial pressure upon said material.

The assemblage is then held under the said initial pressure to allow a "breathing" period until all gas has escaped from the heated moldable material. A final pressure is then applied upon said material to produce an accurate impression of the mold upon the pattern being molded and to move the plate 11 into contact with suitable stops 14—14, of a predetermined height, which are placed upon the bottom plate 9 of the press to establish the thickness of the said pattern.

The pattern 7–a which has then been produced is allowed to remain in the mold and in the heating press for a suitable length of time to "cure" the said molded pattern until it has become hard to a substantial degree.

When the molded pattern has been sufficiently cured, the mold and pattern are removed from the heating press and the pattern is then separated from the mold and trimmed to remove the flash 7–b.

At this point, an important step of my novel method is put into practice. This step consists of placing the pattern, while still hot, between two flat cooling surfaces, such as those of the cooling press plates 17 and 18, squeezing the pattern between the said surfaces with a predetermined pressure, allowing good thermal conduction to said pattern from both sides thereof, and then holding the pattern flat under said pressure while allowing it to cool gradually and evenly from its top and bottom until it has reached a state in which all stresses due to thermal changes are relieved and all tendency of the pattern to curl or warp has been eliminated and the pattern is then removed from the cooling press as the final step of my improved method.

I have found that my improved method will give best results when it is practiced more specifically in the following steps:

(1) Apply zinc stearate powder on the face of the aluminum sheet 10 which will contact the moldable material.

(2) Apply a coat of liquid graphite on the type face and border surfaces of the mold 5 with a stiff brush and brush it in until it is dry.

(3) Apply a second coat of the liquid graphite over the same surfaces and brush it in until it has again dried.

(4) Apply a third coat of the said liquid graphite only upon the border surface of the mold and let it dry.

(5) Place the mold in a drying oven and let it dry for from one to three minutes, depending upon its thickness, in a temperature of from 250° to 350° F.

(6) Remove the pattern from the drying oven.

(7) Apply a layer of the thermo-setting or thermoplastic moldable material 7 over the pattern to the required depth.

(8) Place the mold on the platen 8 and place the aluminum sheet 10 over the moldable material with the treated face of said sheet contacting the material.

(9) Slide the assemblage into the press upon the plate 9.

(10) Lower the plate 11 on the assemblage to contact the template 10 and then apply a small amount of initial pressure to provide good thermal conduction to the moldable material.

(11) Hold the assemblage under said initial pressure until the moldable material has become plastic and all gas has escaped therefrom.

(12) Apply more pressure slowly to the plate 11 to force the moldable material into the mold and to bring the said plate 11 into contact with the thickness spacers 14—14.

(13) Allow the moldable material to cure in the heating press for approximately from eight to twelve minutes while gradually reducing the pressure to a predetermined amount.

(14) Open the heating press and remove mold and pattern.

(15) Separate the pattern from the mold.

(16) Trim the edges of the pattern to remove the flash.

(17) Place the pattern between the plates 17 and 18 of the cooling press.

(18) Lower the plate 17 and squeeze the pattern between the cooling plates 17 and 18 to provide good thermal conduction evenly to the pattern from both sides thereof and let it cool for from three to five minutes, depending upon the size and thickness of the pattern.

(19) Remove the completed pattern from the cooling press.

I have found it to be very important that the hot molded pattern or plate be allowed to cool slowly and equally from both sides while it is held flat under pressure between cooling surfaces. When this is done, the completed pattern remains perfectly flat through its entire life and this is apparently due to the stresses in the pattern being relieved by the gradual cooling while it is held flat and thereby preventing the curling and warping of the pattern which has heretofore been a serious handicap in the handling and stacking of the patterns and in their use for producing mats therefrom.

I claim:

1. The method of making pattern plates of thermo-active material which includes forming said pattern plates in a mold by applying heat to a moldable material in said mold to produce the pattern plate, allowing said moldable material to cure under said heat for a predetermined period of time, then separating the pattern plate from the mold while hot, and then holding the said pattern plate between two flat surfaces while allowing it to cool.

2. The method of making pattern plates of thermo-active material which includes molding said plates in a mold under pressure and heat, permitting the molded plates to cure, then separating the molded plate from the mold while hot, holding the said plate flat under pressure between two flat surfaces, and causing said plate to cool gradually while held flat.

3. The method of making pattern plates of thermo-active material from a mold which includes applying a coat of a releasing agent to the face of the mold, brushing said coating into the mold until it is dry, applying a second coat of said releasing agent into the mold, again brushing it in until it is dry, applying a third coat to the border of the mold and allowing it to dry, placing the mold in a heated oven and allowing it to dry for a predetermined period of time, removing said mold from the oven and placing thereon a thermo-active moldable material, placing the said mold with the material thereon in a heating press, squeezing the said moldable material into the mold under heat and pressure for a predetermined period of time, allowing the moldable material to cure, removing the mold and pattern from the heating press, detaching the molded pattern plate from the mold while hot, placing the said hot pattern plate between two flat cooling surfaces, and squeezing the pattern between said flat surfaces while allowing it to gradually and evenly cool.

4. The method of making a flat pattern plate of thermo-active material from a mold which includes applying liquid graphite to the surface of the mold, brushing said graphite into the mold until it is dry, applying an additional coat of liquid graphite to the border of the mold and allowing it to dry, placing a thermo-active moldable material upon the mold, placing the mold and material in a heating press, applying pressure and heat upon the moldable material to cause it to become plastic, applying more pressure to force said material into the mold and thereby molding a pattern plate therefrom, holding said mold and pattern plate under the heat and pressure of the heating press until the molded pattern plate has been cured, removing the mold and pattern plate from the heating press, separating the cured pattern plate from the mold while hot, placing the pattern plate, while still hot, between two flat cooling surfaces in a cooling press, then allowing said pattern plate to cool gradually and evenly from the top and bottom thereof, and then removing the pattern plate from the cooling press.

References Cited in the file of this patent

UNITED STATES PATENTS

| | | |
|---|---|---|
| 1,377,501 | Novotny | May 10, 1921 |
| 1,377,509 | Novotny | May 10, 1921 |
| 2,246,463 | Garatt | June 17, 1941 |
| 2,386,976 | Putnam | Oct. 16, 1945 |
| 2,617,149 | Rubin | Nov. 11, 1952 |